United States Patent
Cengiz et al.

(10) Patent No.: US 7,685,155 B2
(45) Date of Patent: Mar. 23, 2010

(54) SYSTEM AND METHOD OF PROVIDING AND UTILIZING AN OBJECT SCHEMA TO FACILITATE MAPPING BETWEEN DISPARATE DOMAINS

(75) Inventors: Ilker Cengiz, Redmond, WA (US); Luca Bolognese, Redmond, WA (US); Jason Z. Zhu, Redmond, WA (US); Dempsey R. Swan, Woodinville, WA (US); David E. Sceppa, Seattle, WA (US); Andrew J. Conrad, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 10/806,526

(22) Filed: Mar. 23, 2004

(65) Prior Publication Data

US 2005/0216501 A1    Sep. 29, 2005

(51) Int. Cl.
*G06F 7/00* (2006.01)
*G06F 17/00* (2006.01)
*G06F 17/30* (2006.01)

(52) U.S. Cl. .................. 707/103 R; 707/3; 707/10; 707/104.1

(58) Field of Classification Search ............... 707/3, 707/100, 103, 104.1, 10, 103 R, 809; 706/52
See application file for complete search history.

(56) References Cited

U.S. PATENT DOCUMENTS

| | | | |
|---|---|---|---|
| 5,315,709 A | 5/1994 | Alston | |
| 5,668,991 A | 9/1997 | Dunn | |
| 5,710,917 A | 1/1998 | Musa et al. | |
| 5,729,739 A | 3/1998 | Cantin et al. | |
| 5,926,833 A | 7/1999 | Rasoulian et al. | |
| 5,937,409 A | 8/1999 | Wetherbee | |
| 5,987,247 A | 11/1999 | Lau | |
| 6,006,230 A * | 12/1999 | Ludwig et al. | 707/10 |
| 6,018,743 A | 1/2000 | Xu | |
| 6,038,565 A | 3/2000 | Nock | |
| 6,041,386 A | 3/2000 | Bello | |
| 6,061,515 A | 5/2000 | Chang | |
| 6,076,090 A | 6/2000 | Burroughs | |
| 6,154,748 A | 11/2000 | Gupta | |
| 6,370,541 B1 | 4/2002 | Chou et al. | |
| 6,569,207 B1 | 5/2003 | Sundaresan | |
| 6,581,062 B1 | 6/2003 | Draper | |

(Continued)

OTHER PUBLICATIONS

Enterprise Java Beans Specification Version 2.1. http://java.sun.com/products/ejb/docs.html. Last viewed on Jun. 17, 2004. 646 pages.

(Continued)

*Primary Examiner*—Kavita Padmanabhan
*Assistant Examiner*—Chelcie Daye
(74) *Attorney, Agent, or Firm*—Workman Nydegger

(57) ABSTRACT

The present invention relates to a system and methodology to facilitated data object persistence. An object schema is utilized to provide metadata for types in addition to what is provided by the type system for an underlying programming language. This metadata is then utilized by the system to translate data to and from user objects during a materialization or persistence process. The object schema provides information external to programming logic and type definitions. Consequently, the object schema can be deployed independent of an application thereby allowing the persistence storage of user objects to change without force the user to recompile and deploy application code.

16 Claims, 14 Drawing Sheets

U.S. PATENT DOCUMENTS

| | | | |
|---|---|---|---|
| 6,631,519 | B1 | 10/2003 | Nicholson |
| 6,769,124 | B1 | 7/2004 | Schoening |
| 6,820,135 | B1 | 11/2004 | Dingman |
| 6,853,997 | B2* | 2/2005 | Wotring et al. .............. 707/100 |
| 6,907,433 | B2* | 6/2005 | Wang et al. .............. 707/104.1 |
| 7,136,843 | B2* | 11/2006 | Bigus et al. ................... 706/52 |
| 2002/0078094 | A1 | 6/2002 | Krishnaprasad |
| 2002/0103793 | A1* | 8/2002 | Koller et al. ................... 707/3 |
| 2003/0055828 | A1 | 3/2003 | Koch |
| 2003/0074358 | A1 | 4/2003 | Sarbaz |
| 2003/0093770 | A1 | 5/2003 | Fernandez |
| 2003/0101170 | A1 | 5/2003 | Edelstein |
| 2003/0217069 | A1 | 11/2003 | Fagin |
| 2004/0015783 | A1 | 1/2004 | Lennon |
| 2004/0044959 | A1 | 3/2004 | Shanmugasundaram |
| 2005/0210124 | A1* | 9/2005 | Chua .......................... 709/219 |
| 2009/0024642 | A1 | 1/2009 | Vaschillo |

OTHER PUBLICATIONS

JSR 12: Java Data Objects Specification Final Release 2. http://jcp.org/en/jsr/detail?id=012. Last viewed on Jun. 17, 2004. 200 pages.

Oracle Application Server TopLink Unit of Work Whitepaper. http://otn.oracle.com/products/ias/toplink/technical/unitOfWorkWP.pdf. Aug. 2003. 35 pages.

CocoBase Enterprise O/R Dynamic Mapping for the Enterprise Version 4.0: Object to Relational Mapping Concepts. http://www.thoughtinc.com/MappingConcepts.pdf. Last changed on Oct. 17, 2002, 14 pages.

J. Grundy, S. Newby, T. Whitmore, and P. Grundeman. Extending a Persistent Object Framework to Enhance Enterprise Application Server Performance. Proceedings of the 3rd Australasian Conference on Database Technologies-vol. 5, pp. 57-64, 2002.

Hong-Hai Do, et al., "COMA - A System for Flexable Combination of Schema Matching Approaches" In Proceedings of the 28th International Conference on Very Large Databases, (VLDB), 2002.

Jayant Madhavan et al., "Generic Schema Matching with Cupid", In Proceedings of the International Conference on Very Large Databases (VLDB), 2001.

Phillip Bernstein, "Applying Model Management to Classical Meta Data Problems", CIDR 2003-Innovative Data Systems Research, Proceedings of the First Biennial Congerence ON, [Online] Jan. 7, 2003, pp. 1-12, XPoo2457989, Asilomar, CA, USA, Retreived from the Internet: URL:http://www-db.cs.wisc.edu/cidr/cidr2003/program/ p19.pdf [Retrieved on Otc. 8, 2007].

S. Melnik, et al., Association for Computing Machinery: "Rondo: A Programming Platform for Generic Model Management", SIGMOD 2003, Proceedings fo the ACM Sigmod International Conference on Mangement of Data, San Diego CA, Jun. 9-12, 2003, Proceedings of the ACM Sigmod International Conference on AMangment of Dat, New York, NY, ACM, US Jun. 9, 2003, pp. 153-204.

R. Torlone et al., "A Unified Framework for Data Translation Over the Web", Web Infromation Systems Engineering, 2001, Proceedings of the Second International Conference ON, Piscataway, NJ, USA, IEEE, vol. 1, Dec. 3, 2001, pp. 350-358.

European Search Report for Patent Application No. Ep 04103079 dated Nov. 22, 2007, 5 pages.

Chaitanya Baru, "Xviews: XML Views of Relational Schemas" Proceedings of the Woekshop on Databases and Expert System Applications, 1999, pp. 1-6, Florence Italy.

Dongwon Lee et al., "NeT & CoT: Translating Relational Schemas to XML Schemas Using Semantic Constraints" Proceedings of the 11th International Conference on Information and Knowledge Systems, Nov. 4-9, 2002, pp. 282-291, McLean, Virginia.

Iraklis Varlamis et al., "Bridging XML-Schema and Relational Databases: A System for Generating and Manipulating Relational Databases Using Valid XML Documents", Proceedings of the 2001 ACM Symposium on Document Engineering, 2001, pp. 105-114.

Office Action dated Mar. 6, 2006 cited in U.S. Appl. No. 10/652,214.
Office Action dated Aug. 23, 2006 cited in U.S. Appl. No. 10/652,214.
Office Action dated May 2, 2008 cited in U.S. Appl. No. 10/652,214.
Office Action dated Nov. 12, 2008 cited in U.S. Appl. No. 10/652,214.
Office Action dated Apr. 1, 2009 cited in U.S. Appl. No. 10/652,214.
Office Action dated Jul. 28. 2006 cited in U.S. Appl. No. 10/652,258.
Office Action dated Jan. 3, 2007 cited in U.S. Appl. No. 10/652,258.
Office Action dated May 30, 2007 cited in U.S. Appl. No. 10/652,258.
Office Action dated Oct. 12, 2007 cited in U.S. Appl. No. 10/652,258.
Office Action dated Dec. 21, 2007 cited in U.S. Appl. No. 10/652,258.
Notice of Allowance dated May 15, 2008 cited in U.S. Appl. No. 10/652,258.

* cited by examiner

SYSTEM AND METHOD OF PROVIDING AND UTILIZING AN OBJECT SCHEMA TO FACILITATE MAPPING BETWEEN DISPARATE DOMAINS

CROSS-REFERENCE TO RELATED APPLICATIONS

The subject application is related to U.S. application Ser. No. 10/652,258, entitled "Relational Schema Format" filed Aug. 29, 2003 and U.S. application Ser. No. 10/652,214, entitled "Mapping Architecture for Arbitrary Data Models" filed on Aug. 29, 2003, the entireties of which are incorporated herein by reference.

TECHNICAL FIELD

The present invention relates generally to computers and more particularly toward schema mappings and data persistence.

BACKGROUND

There are a plethora of different computer programming paradigms available today. Each paradigm has been optimized for use in its own particular problem space. However, the technological differences between models can present obstacles for user who wish to employ a plurality of different models in concert so as to leverage the benefits provided by each. For instance, object oriented programming employs of units of software called "objects" which encapsulate both data and functions. Object Oriented Programming (OOP) objects are software entities comprising data structures and operations on data. Together, these elements enable programmers to generate objects to model virtually any real-world entity in terms of its characteristics, represented by its data elements, and its behavior represented by its data manipulation functions.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. The third principle is inheritance, which allows developers to reuse pre-existing design and code. This capability allows developers to avoid creating software from scratch. Rather, through inheritance, developers derive subclasses that inherit behaviors, which the developer then customizes to meet particular needs.

The relational database model is a desirable choice of programmers for use in storing, retrieving and analyzing data. In contrast to the object oriented programming model, however, the fundamental units of operation for relational database management systems are tables. One of the significant benefits of relational databases is that they can store an extremely large quantity of data in part because data is not replicated. Furthermore, relational database are highly scalable and flexible. Additionally, relational database systems are advantageous in that they provide an easy way to analyze and retrieve large amounts of stored data. Relational database data can be analyzed utilizing structured query languages (SQL) to query data. Queries can be used to perform record retrieval and updates, perform calculations, append data to tables, or summarize data in one or more tables. Using queries, a user can specify the criteria for a search and then automatically sort and display all records matching the criteria.

Valuable software applications engage in data manipulation and processing. Accordingly, data needs to be stored somewhere to allow the data to survive the termination of the applications and/or computer shut down. This can be accomplished in a myriad of different ways such as storing data to text files, XML files or other data containers. Such storage can easily be accomplished by serializing objects and writing them to files. However, when applications deal with huge amounts of data there is a need to store data in databases such as a relational database to take advantage of the high performance query operations and consistency in data, among other things. Otherwise, an application would have to search through thousands of entries, in a file for instance, before retrieving desired information. Nevertheless, applications are most often written employing an object-oriented model while databases typically utilize the relational model. Hence, a mapping needs to be developed to provide translation from the object oriented model to the relational model and back from the relational model to the object oriented model. Conventionally, it is a developer's job to develop such a single map between the two worlds. Unfortunately, developing such a mapping component is a complex, time consuming, and error prone task.

Accordingly, there is a need in the art for a system and method to facilitate mapping between disparate domain models such as an object oriented programming model and a relational database model.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention discloses an object schema component. The object schema provides a mechanism for providing a bridge between a transient graph of objects and a related persistent data store. In particular, the object schema provides metadata describing a given set of classes in addition to a program assembly containing type definitions. The metadata can subsequently be utilized by a mapping system to translate relational data to and from user objects during a materialization or persistence process. According to one particular aspect of the present invention, the object schema is defined in a declarative manner in that it is specified as information external to programming logic. By providing this information outside of a users type definitions, the schema can be deployed independently of an associated application thereby allowing persistence storage of objects to change without forcing a user to recompile and redeploy application code.

According to another aspect of the present invention, the object schema can define classes that describe persistent objects. The object schema can also describe or define members associated with one or more classes, wherein a member can include a field or properties of a class. Furthermore, relationships between classes can be described and defined by the object schema. The object schema can also include a plurality of specifiable attributes to assist in describing classes, members, and relationships amongst them. In addition, such attributes can be utilized or specified solely to facilitate querying of an object data source.

According to another aspect of the invention, the object schema is one of three distinct schemas utilized to map objects to a relational data store, for example. A mapping system can employ an object schema, a relational schema and a mapping schema. The object schema can contain definitions of classes, members, and relationships between objects from an object oriented model. The relational schema can provide information regarding tables and fields amongst tables relating to a relational data model. Finally, the mapping schema can utilize references to both the object schema and the relational schema to provide a mapping there between.

According to still another aspect of the present invention, a schema generation system is disclosed to automatically generate an object schema from provided object code. More specifically, the system can retrieve object data from a provided application and provide it to a generation component. The generation component can subsequently utilize information concerning a corresponding relational model and object information to produce an object schema.

According to yet another aspect of the present invention a graphical user interface can be utilized to generate an object schema. A free form user interface can be provided including a plurality of graphical objects and components (e.g., buttons, tabs, text boxes, check boxes, menus . . . ) that a developer can utilize to easily specify metadata concerning objects and thereby produce an object schema. Additionally or alternatively, a wizard can be employed to guide a developer through construction of a schema from a given object program.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. For example, a computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the subject invention.

Figure 1:
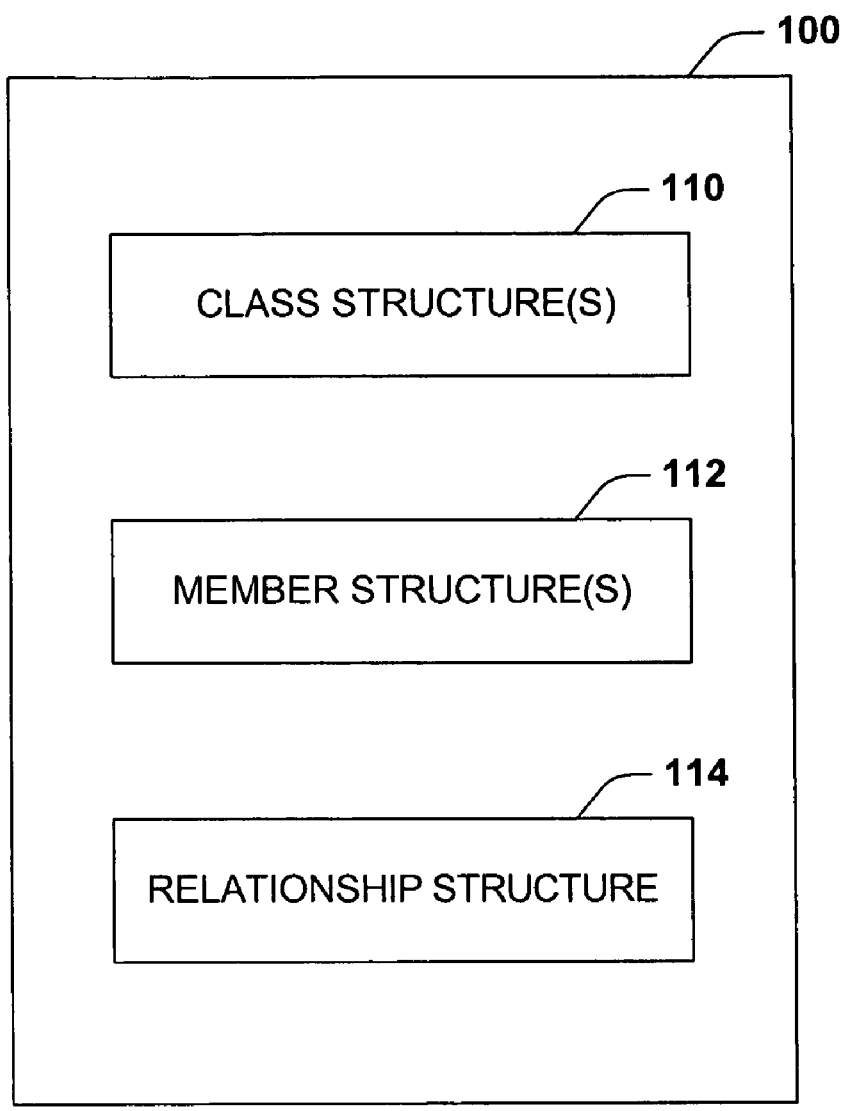
FIG. 1 is a schematic block diagram of an object schema data structure in accordance with an aspect of the present invention.

Turning to FIG. 1, an object schema data structure 100 is illustrated in accordance with an aspect of the present invention. An object schema data structure 100 provides persistent metadata information related to types (e.g., common language runtime (CLR) types), essentially the schema provides additional information on top of type system information supplied by a language platform. In particular, an object schema data structure 100 is a prescriptive definition of persistent objects including their relationships. The object schema data structure 100 can be one of three schemas utilized to facilitate mapping object components to relational components, for example, as described in further detail in later sections. It is to be appreciated, however, that the object schema is not limited to mapping to relational data sources. In fact, one benefit of utilizing three logical parts to the mapping is that the ends can be replaced. Object schema 100 comprises class structure(s) 110, member structure(s) 112, and a relationship structure 114. Class structure(s) 110 describe programmatic objects. Member structure(s) 112 describe members of a class. Members of a class can include but are not limited to fields and properties. Together the class structure(s) 110 and associated member structure(s) 112 define a persistent view for objects. Additionally, object schema 100 includes a relationship structure 114. Relationship structure 114 defines relationships between types, such as parent-child relationships, for example. The object schema data component can be provided in any format, however according to an aspect of the invention the schema can be written utilizing an extensible markup language (XML). The use of XML is advantageous in the present invention at least in part because it is easy to read and generate manually. Additionally, XML is flexible and widely known. The following is an exemplary object schema in accordance with an aspect of the subject invention:

```
<osd:ExtendedObjectSchema Name="MyObjectSchema"
xmlns:osd="http://schemas.microsoft.com/data/2002/09/20/persistenceschema">
    <osd:Classes>
            <osd:Class Name="ObjectSpacesDemo.Data.Customer">
                <osd:Member Name="Id" Key="true" KeyType="AutoIncrement" />
                <osd:Member Name="Name" />
                <osd:Member Name="Address" />
                <osd:Member Name="City" />
                <osd:Member Name="Telephone" />
                    <osd:Member Name="Invoices" />
            </osd:Class>
            <osd:Class Name="ObjectSpacesDemo.Data.Invoice">
                <osd:Member Name="Id" Key="true" KeyType="AutoIncrement" />
                <osd:Member Name="Product" />
                <osd:Member Name="Amount" />
                <osd:Member Name="Price" />
                <osd:Member Name="Customer" />
            </osd:Class>
        </osd:Classes>
    <osd:ObjectRelationships>
            <osd:ObjectRelationship Name="CustomerInvoices"
            Type="OneToMany" ParentClass="ObjectSpacesDemo.Data.Customer"
            ParentMember="Invoices"
            ChildClass="ObjectSpacesDemo.Data.Invoice"
            ChildMember="Customer"/>
    </osd:ObjectRelationships>
</osd:ExtendedObjectSchema>
```

The above object schema comprises metadata, which describes the following programmatic class definitions:

```
namespace ObjectSpacesDemo.Data {
public class Customer
{
    long _id;
    string _name;
    string _address;
    string _city;
    string _telephone;
    System.Collections.ArrayList _invoices;
    public long Id
    {       get             {return _id; }
            set {_id = value; } }
    public string Name
    {       get             { return _name; }
            set             {_name = value; } }
    public string Address
    {       get             { return _address; }
            set             { _address = value; } }
    public string City
    {       get             { return _city; }
            set             { _city = value; } }
    public string Telephone
    {       get             { return _telephone; }
            set             { _telephone = value; } }
    public System.Collections.ArrayList Invoices
            { get { return _invoices; }
            set             { _invoices = value; } }
    public Customer( ) {
            _invoices = new System.Collections.ArrayList( ); }
}
public class Invoice
{
    long _id;
    string _product;
    long _amount;
    long _price;
    Customer _customer;

public long Id
    {       get             { return _id; }
            set             { _id = value; } }
    public string Product
    {       get             { return _product; }
            set             { _product = value; } }
    public long Amount
    {       get             { return _amount; }
            set             { _amount = value; } }
    public long Price
    {       get             { return _price; }
            set             { _price = value; } }
    public Customer Customer
    {       get             { return _customer; }
            set             { _customer = value; } }
    public Invoice( ) {}
}
```

Figure 2:
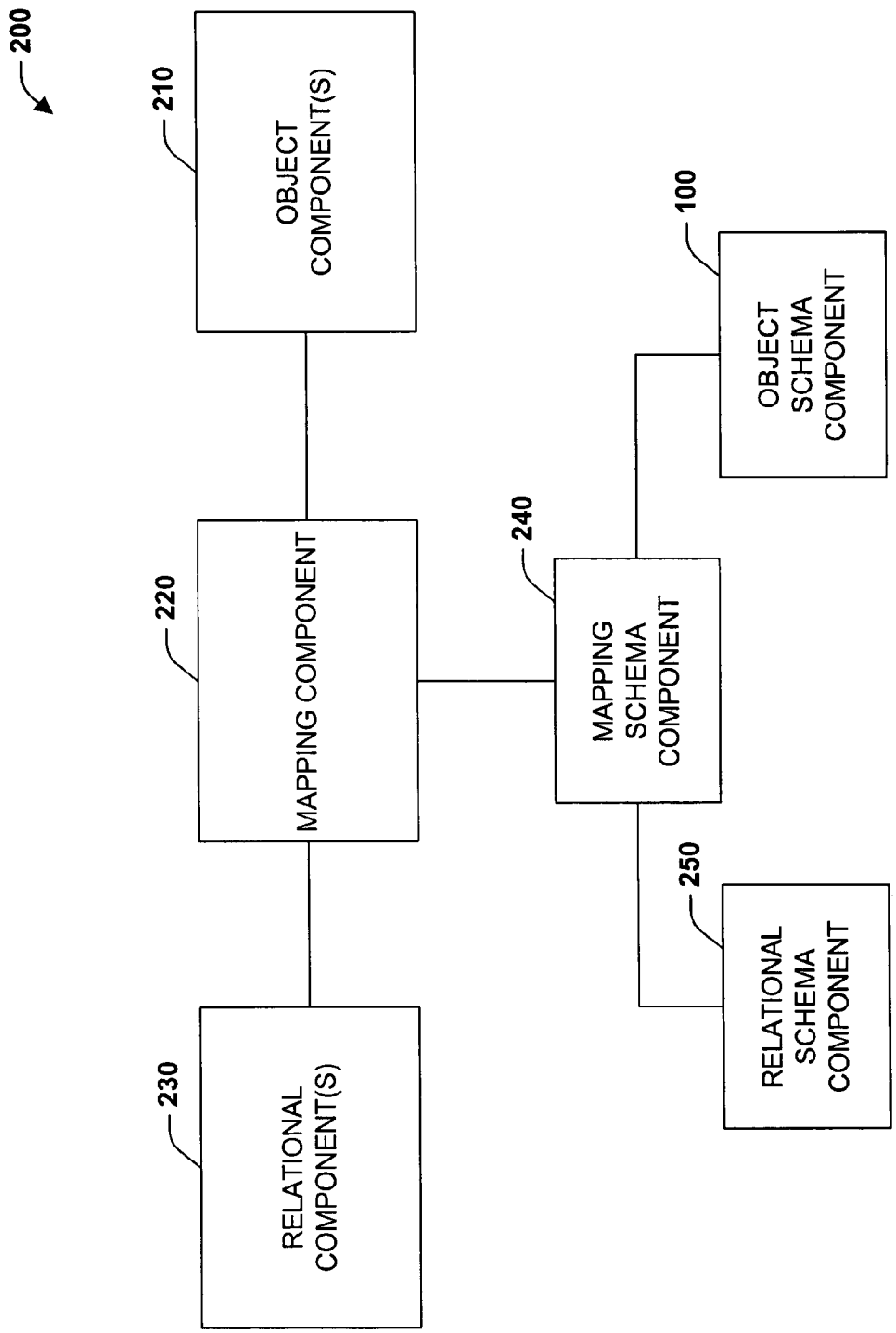
FIG. 2 is a schematic block diagram of a mapping system in accordance with an aspect of the present invention.

Turning to FIG. 2, a system 200 for mapping object components to relational components is described. The object schema 100 (FIG. 1) of the present invention provides one portion of a three-part mapping. System 200 includes object component(s) 210, mapping component 220, relational component(s) 230, mapping schema component 240, relational schema component 250, and object schema component 100. Object component(s) 210 represent user programmatic structures for example as specified in an object oriented programming language (e.g., C++, C# . . . ). Relational component(s) 230 correspond to tables in a relational model. Mapping component 220 resides between object component(s) 210 and relational component(s) 230 and provides a mapping or bridge between the two disparate models (e.g., mapping data object fields to appropriate tables and rows). To provide such mappings, mapping component 220 utilizes three schema components, an object schema 100, a mapping schema 240 and a relational schema 250. The object schema component 100, as described herein, describes data classes as well as relations there between as specified in an object-oriented model, for example. Relational schema component 250 contains information describing tables and associated data records in a relational database model, for instance. Stated differently, the relational schema component 250 can utilize metadata associated with a database to generate an implementation neutral or implementation specific format that represents the precise database structure and data. Further information regarding the relational schema component 250 can be found in U.S. application Ser. No. 10/652,258, entitled "Relational Schema Format" filed Aug. 29, 2003 which is incorporated herein by reference. Mapping schema component 240 provides the mapping between the object schema 100 and the relational schema 250. Further information concerning the mapping schemas component 240 can be found in U.S. application Ser. No. 10/652,214, entitled "Mapping Architecture for Arbitrary Data Models" filed Aug. 29, 2003, which is incorporated herein by reference. The disclosed system 200 is advantageous at least in that applications do not need to be rebuilt and redeployed if the manner in which data is persisted changes, for example if table names change or tables are broke up into smaller tables. Rather the appropriate schema components can be easily modified to effectuate such alternations. It should also be appreciated and noted that mapping component 220 can support basic functionality on object data such as create, read, update, and delete. To provide for such functionality the mapping component can facilitate object data querying. Querying relational data is quite simply-just utilize a structured query language (SQL). However, querying an object data source is somewhat different. In fact, a special language can be employed to query object data sources (e.g., OPath). Accordingly, the object schema can also supply metadata that relates to supporting querying of an object data source.

Figure 3:
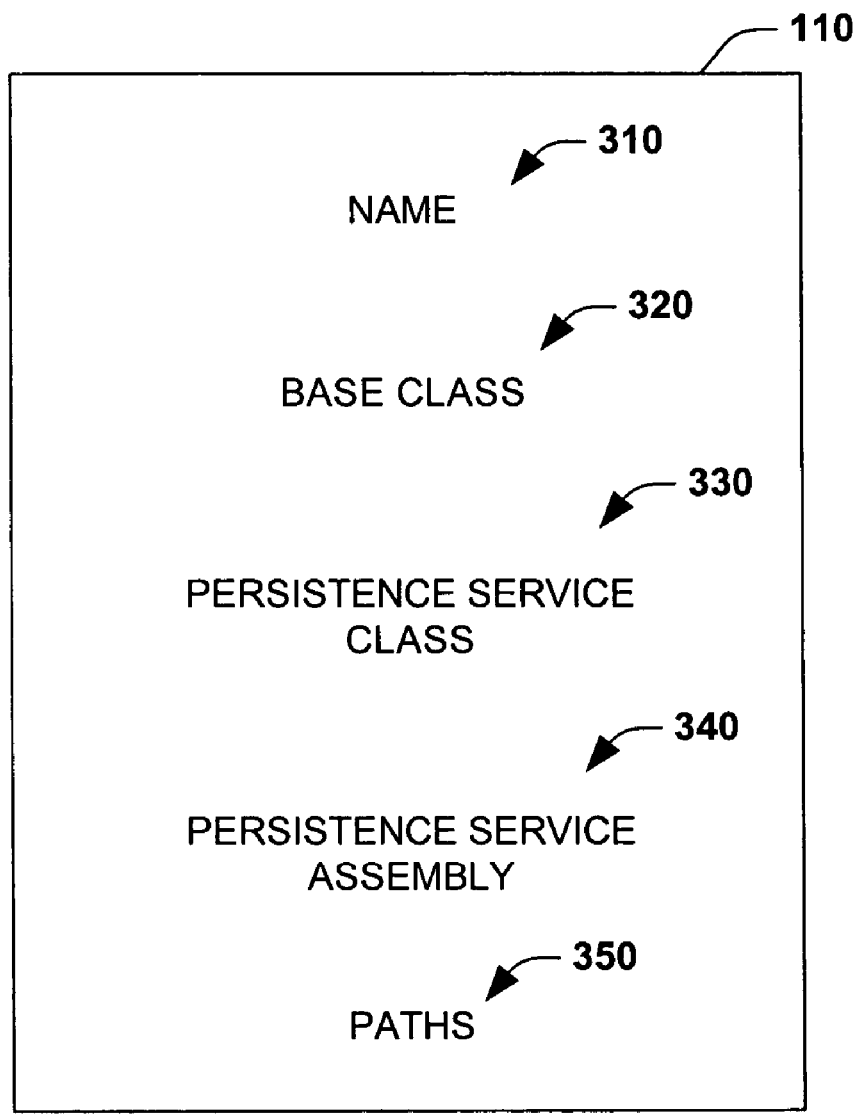
FIG. 3 is a schematic block diagram of a class structure in accordance with an aspect of the subject invention.

Turning to FIG. 3, a class structure 110 is depicted in further detail in accordance with an aspect of the present invention. Class structure 110 can comprise a plurality of attributes including but not limited to name 310, base class 320, persistence service class 330, persistence service assembly 340, and paths 350. The name attribute 310 provides a string representative of the name of the class. When necessary this can be a fully qualified name, for example to distinguish between two customer classes defined in different namespaces. Base class 320 provides the name of a base class for instance when inheritance is used as part of the schema description. Persistence service class 330 can provide the name of a persistence service to use when persisting a particular class with which this attribute is associated. If not specified, a default persistence service can be employed. Persistence service assembly attribute 240 can provide the name of an assembly or other group of files that contains a user defined persistence service class. Paths 350 can be an optional attribute that is utilized as an identifier in different contexts in a given object graph. For example, in a sample containment hierarchy, Customer/Address and Employee/Address are the same underlying address type but may have different mappings. The paths specified by the path attribute 350 can be indicated via unique opaque strings for each context of a given class. In order to not introduce a path attribute 350 on every object schema element that refers to a class, any string that refers to a path can combine the path and the class name by delimiting the two via the "/" delimiter, or the like. In a given string the last delimiter separates the path from the class name. The paths attribute 350 can be utilized in at least two scenarios. First, the path attribute 350 can be used when a user defines a single class definition for different contexts, but requires the ability to map to each context. For example:

```
<osd:Class Name="Address" Paths="Company/Customer
Company/Employee">
...
</osd:Class>
...
<osd:ObjectRelationship Name="Customer_Address"
ParentClass="Company/Customer"
ChildClass="Company/Customer/Address".../>
...
```

Paths attribute 350 can also be employed when multiple class definitions are needed in addition to multiple maps. For instance:

```
<osd:Class Name="Address" Paths="Company/Customer">
    <osd:Member Name="id">
    <osd:Member Name="Bar">
</osd:Class>
<osd:Class Name="Address" Paths="Company/Employee>
    <osd:Member Name="id">
    <osd:Member Name="Foo">
</osd:Class>
...
<osd:ObjectRelationship Name="Customer_Address"
ParentClass="Company/Customer"
ChildClass="Compay/Customer/Address".../>
...
```

Thus for either of the two different representations a mapping schema component 240 (FIG. 2) can be defined which can map to different contexts. For example:

```
<m:Map Source="C_Addresses"
Target="Company/Customer/Address">
...
</m:Map>
<m:Map Source ="E_Addresses"
Target="Company/Employee/Address">
...
</m:Map>
```

Figure 4:
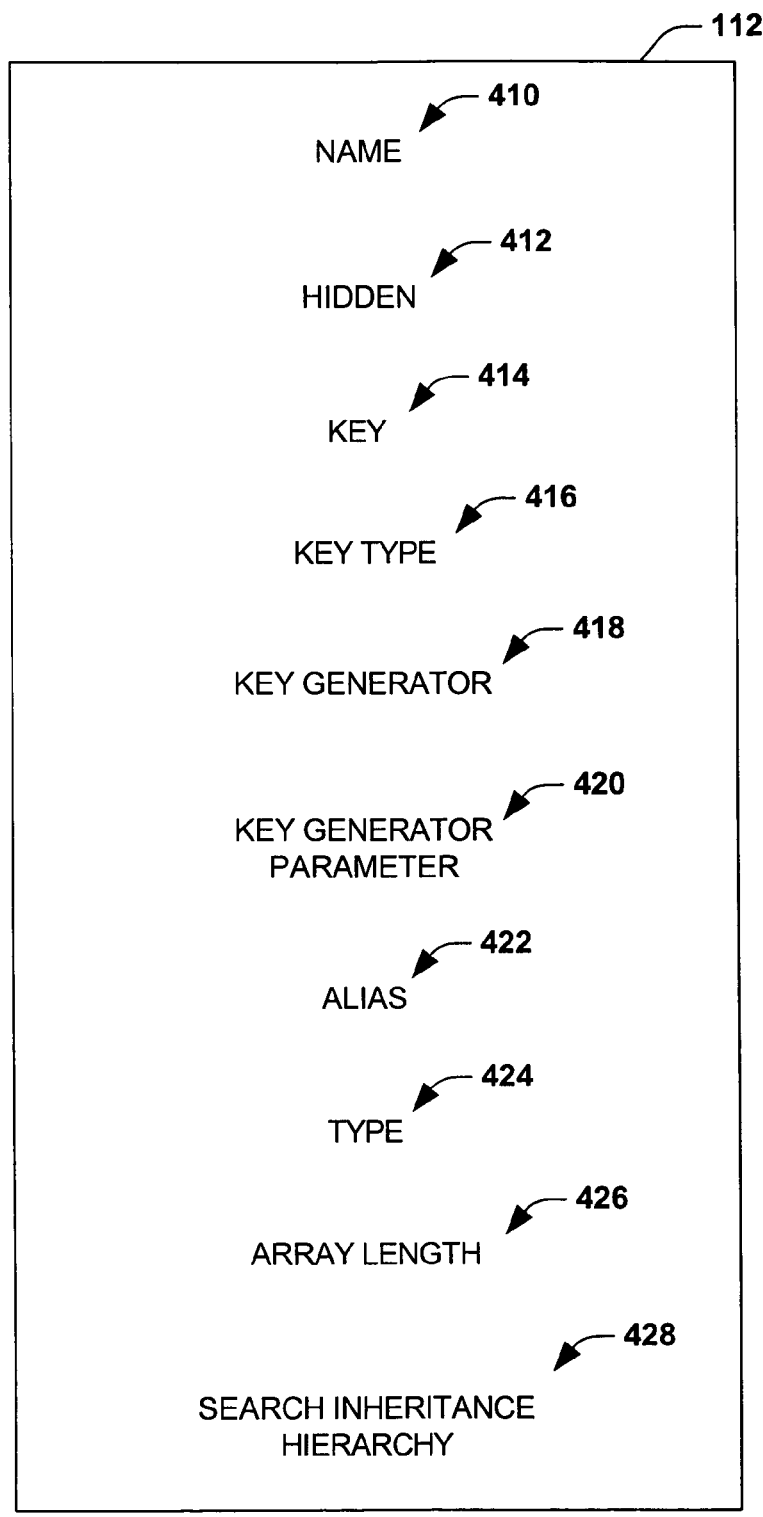
FIG. 4 is a schematic block diagram of a member structure in accordance with an aspect of the present invention.

FIG. 4 illustrates a member structure 112 in further detail in accordance with an aspect of the subject invention. As depicted, the member structure 112 can include a plurality of attributes including but not limited to name 410, hidden 412, key 414, key type 416, key generator 418, key generator parameter 420, alias 422, type 424, array length 426, and search inheritance hierarchy 428. Name attribute 410 can be a string representing the name of a member (e.g., field, property). Hidden attribute 412 can be a Boolean value defining if there is a hidden member such as a field in a corresponding class. More specifically, hidden attribute 412 can represent whether or not there is a member in the corresponding type. If there is not a member in the corresponding type, then that the value needs to be maintain out of band of the runtime object. Hidden 412 can be employed for implicitly managed keys as well as time stamp and row version properties. Users don't want to complicate their object model with such properties, so they can be hidden members. The present invention provides for hidden member storage and manages them in a transparent fashion. Users can choose to expose hidden members in the object model if they so desire by setting hidden="false" or by not utilizing the hidden attribute. Key 414 is a Boolean attribute that defines weather the member associated therewith is part of an object key. If key 414 is not specified, false can be assumed. If key 414 is true and hidden 412 is false can indicate that key 414 is explicitly managed by user assigned values. It should be appreciated that it is possible to create a class that does not have a key defined and does not inherit from a class that has a key defined in the appropriate format. Such a class can be considered "read-only" and can be materialized but not persisted. Key type 416 describes the kind of key supported (e.g., custom). Key type 416 can be required if hidden 412 and key 414 are true. Key generator attribute 418 names the user class that will act as a custom key generator. Key generator parameter 420 can be utilized to pass parameters to the key generator (e.g., to the initialize function of the generator). Alias 422 provides a name of a member that can be utilized as an alias to the member with which this attribute is associated. This can be employed in queries. For example, alias 422 can be employed by a query language to identify the private member to use to generate a query. Its value points to a public member that can be utilized instead of the associated private member in the text of a query. Type 424 is an attribute that identifies the type of a member. This can be utilized to override the type specified in a parent type's definition. Array length 426 is utilized when a member stands for an array. Array length 426 is an integer that designates the length of the corresponding array. This attribute can be used in mapping validation. For example assuming a class account is defined as

```
Class Account {
    int id;
    string[] segments;
}
```
and a table represents accounts as Accounts
(ID, SEGMENT1, SEGMENT2,
SEGMENT3), then the object schema can be specified as follows:
```
<osd:Class Name="OrderLine">
    <osd:Member Name="id">
    <osd:Member Name="segments" ArrayLength="3"
    Type="System.String">
</osd:Class>
```

Search inheritance hierarchy 428 is a Boolean flag that tells a search system to search the inheritance hierarchy for a private member. If the value is false, private members in base classes will not be searched for unless the base type is also a persistent type defined by the object schema. For example, if the object models is specifies

```
Public abstract class CompanyBase {
    //Fields
    private string name;
}
public abstract class Company : CompanyBase {
    //Fields
    private string id;
}
```
then the an object schema relationship can be specified as follows:
```
<osd:Class Name="Company">
    <osd:Member Name = "id" Key="true">
    <osd:Member Name = "name" SearchInheritanceHierarchy="true">
</osd:Class>
```

It should be noted that in this example CompanyBase is not a persistent type, so it is not in the identified in the schema.

Figure 5:
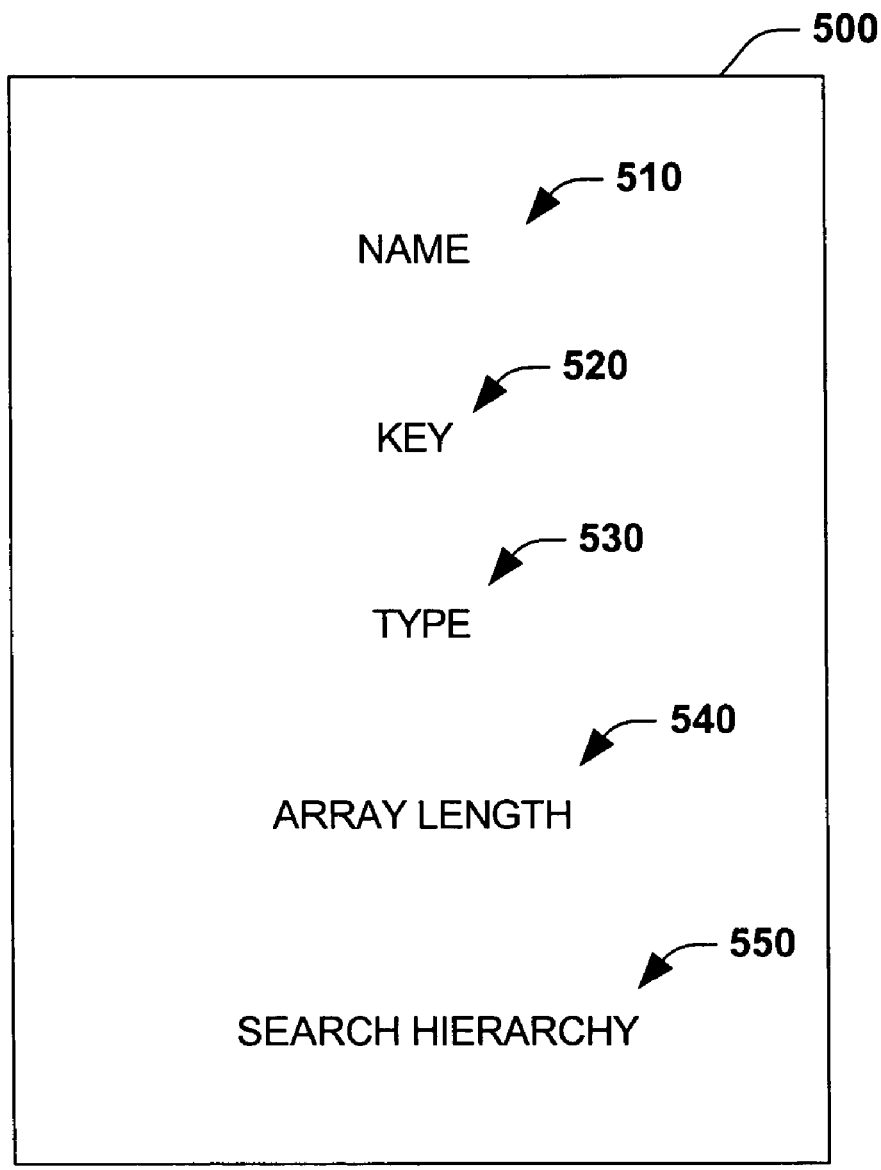
FIG. 5 is a schematic block diagram of a compound member structure in accordance with an aspect of the subject invention.

Member structure(s) 112 can also comprise compound members. Compound members allow mapping of complex members as inline members of a given class. For instance, this can allow inline mapping of arrays, structs, and entity key members. Each compound member can contain members or other compound members. Turing to FIG. 5, a compound member 500 is depicted in accordance with an aspect of the subject invention. Compound member can include attributes such as name 510, key 520, type 530, array length 540, and search inheritance hierarchy 540. Name attribute 510 specifies the name of the member (e.g., field, property . . . ) to which a compound member maps. Key 520 is a Boolean value that defines whether a compound member is part of an object key. If key 520 is not specified, then false can be assumed. A key 520 being true means all sub-members of compound members are part of a key. If compound member is a key its sub-members key types can define a key generation scheme. Type 530 specifies the type of a member. It stands for an element type in case the compound member is an array. Where reflection cannot provide the type intended for a member, the type attribute 530 is mandatory. Array length 540 can be provided as an attribute if the compound member is an array. Array length 540 specifies that a member is a fixed length array with the length specified. Furthermore, this attribute can be utilized in mapping validation. Search inheritance hierarchy is a Boolean flag, which can be employed by a user to specify that private members in an inheritance hierarchy can be searched. For purposes of clarity and understanding, the following is an exemplary compound member that can be a part of an object schema in accordance with the present invention. The example illustrates a class with a member and a compound member with a member and compound member embedded within a compound member.

```
<osd: Class Name="Foo">
    <osd:Member Name="id"/>
    <osd:CompoundMember Name="Bar" Type="Foo+Bar">
        <osd:Member Name="id"/>
        <osd:CompoundMember Name="Bar2"
        Type="Foo+Bar+Bar2">
            <osd:Member Name="a"/>
            <osd:Member Name="b"/>
        </osd:CompoundMember>
    </osd:CompoundMember>
</osd:Class>
```

An inline class (struct) can define a function within a class. An inline class can be represented as a compound member. For example assume the object model is specified as follows:

```
Class OrderLine {
    int id;
    Quantity q1;
}
struct Quantity {
    int unit;
    float value;
}
```

This inline class and associated function can be represented in an object schema as follows:

```
<osd:Class Name="OrderLine">
    <osd:Member Name="id">
    <osd:CompoundMember Name="q1">
        <osd:Member Name="unit"/>
        <osd:Member Name="value"/>
    </osd:CompoundMember>
</osd:Class>
```

Figure 6:
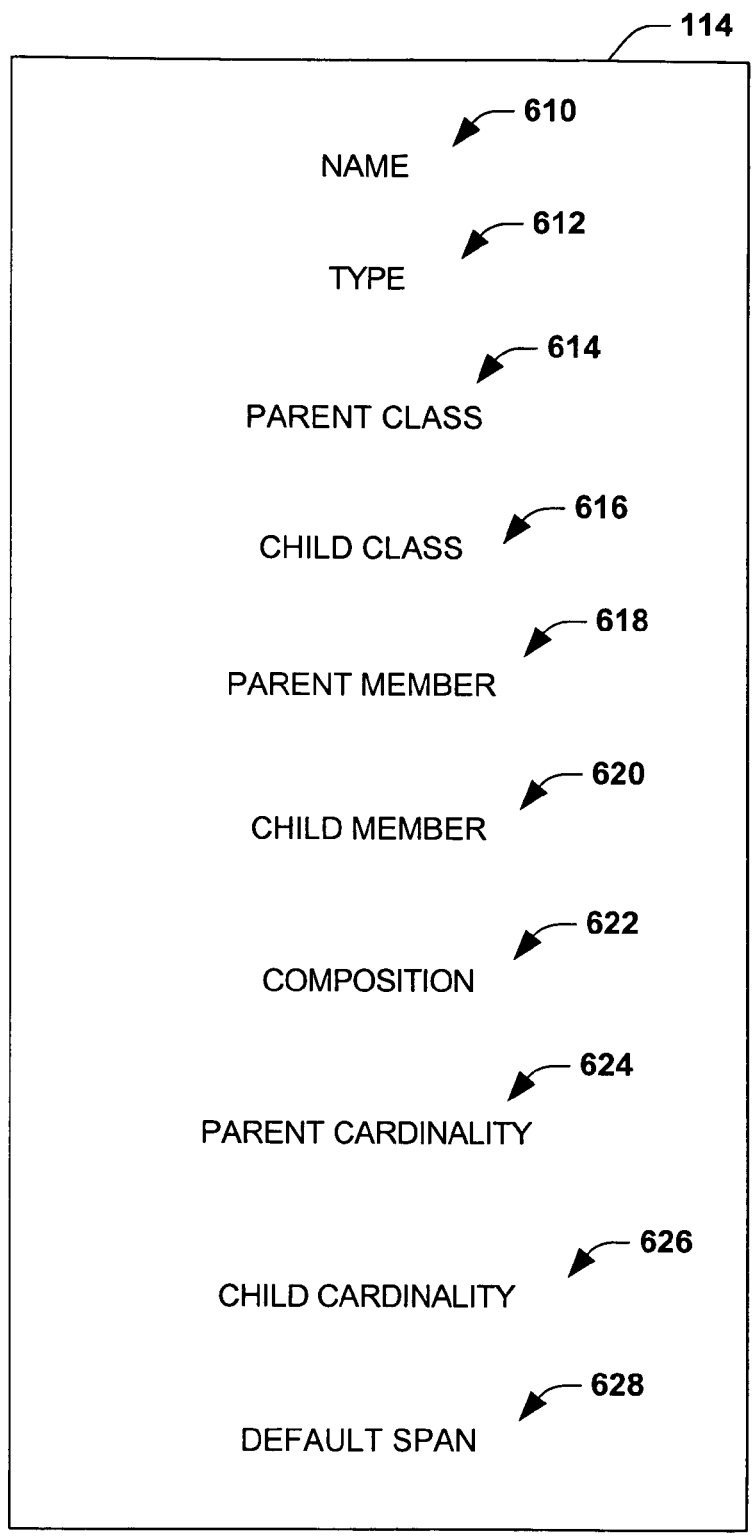
FIG. 6 is a schematic block diagram of a relationship structure in accordance with an aspect of the subject invention.

Turning to FIG. 6, a relation structure 114 is illustrated in accordance with an aspect of the present invention. Relation structure 114 can be utilized to specify relationships amongst objects or classes. Relation structure 114 can comprise a plurality of attributes utilized to describe object relationships including but not limited to name 610, type 612, parent class 614, child class 616, parent member 618, child member 620, composition 622, parent cardinality 624, child cardinality 626, and default span 628. Name attribute 610 specifies a unique name identifying a relationship (e.g., customer invoice, customer order . . . ). Type 612 can be used to identify a predefined relationship (e.g., one-to-one, one-to-many, many-to-many . . . ). Parent class 614 identifies the parent class in a relationship, while child class 616 identifies the child class in the relationship. Parent member 618 is an optional attribute that specifies the name of a parent class' member that is related. Child member 620 is an optional attribute that names a child class' member that is related. Composition 622 is a Boolean value that defines whether or not a relationship is a composition. If not specified, composition 622 can be assumed to be false. Parent cardinality 624 is an optional attribute that defines parent cardinality for a relationship. Child cardinality 626 is an optional attribute, which specifies child cardinality for a relationship. Both parent cardinality 624 and child cardinality 626 can have values corresponding to one, zero or more, or many. Finally, a relation structure 114 can include a default span optional attribute 628. Default span 628 defines the default span for a relationship and can include values such as parent-to-child, child-to-parent, and both sides. If a value is parent-to-child this means that when the parent type is loaded, the child side will be loaded by default. A value of child-to-parent indicates that when the child side is loaded, the parent side will be loaded by default. If the value is both sides then when either side (e.g., parent or child) is loaded, the other side will be loaded by default. To further appreciate the use of some of the above described attributes the following sample object schema is provided:

```
<ExtendedObjectSchema Name="northwindOBJ"
xmlns=http://schemas.microsoft.com/data/2002/09/20/extendedobjectschema>
<Classes>
    <Class Name="Customer">
        <Member Name="customerId" Key="true"/>
        <Member Name="contactName" />
        <Member Name="contactTitle" />
        <Member Name="companyName" />
        <Member Name="address" />
        <Member Name="city" />
        <Member Name="region" />
        <Member Name="postalCode" />
        <Member Name="phone" />
        <Member Name="fax" />
        <Member Name="myOrders" />
    </Class>
    <Class Name="Order">
        <Member Name="orderId" Key="true"/>
        <Member Name="orderDate"/>
        <Member Name="requiredDate"/>
        <Member Name="shippedDate"/>
        <Member Name="freight"/>
        <Member Name="my Customer"/>
    </Class>
</Classes>
<ObjectRelationships>
    <ObjectRelationship Name="CustomerOrder" Type="OneToMany"
ParentClass="Customer" ChildClass="Order" ParentMember="myOrders"
ChildMember="myCustomer"/>
</ObjectRelationships>
</ExtendedObjectSchema>
```

This object schema sets forth two classes: customer and order. The object relationship attributes indicated that the relationship name is CustomerOrder and the type of relationship is OneToMany. A one-to-many relationship indicates that one object class is associated with more than one other object class. Here, each customer can be associated with a plurality of orders. Accordingly, parent class is set to customer and child class to order. Furthermore, parent member is associated with the myOrders field in the parent class and child member is associated with the myCustomer field of the child class.

It should be appreciated that what has been described thus far are exemplary object schemas and portions thereof. The present invention contemplates multiple different types of object schemas specified in different languages (e.g., other than XML) with more, less, and/or different attributes associated therewith. The provided object schemas and description thereof have been supplied for purpose of clearly describing various aspects of the subject invention and are not meant to limit the scope of the present invention in any way.

Figure 7:
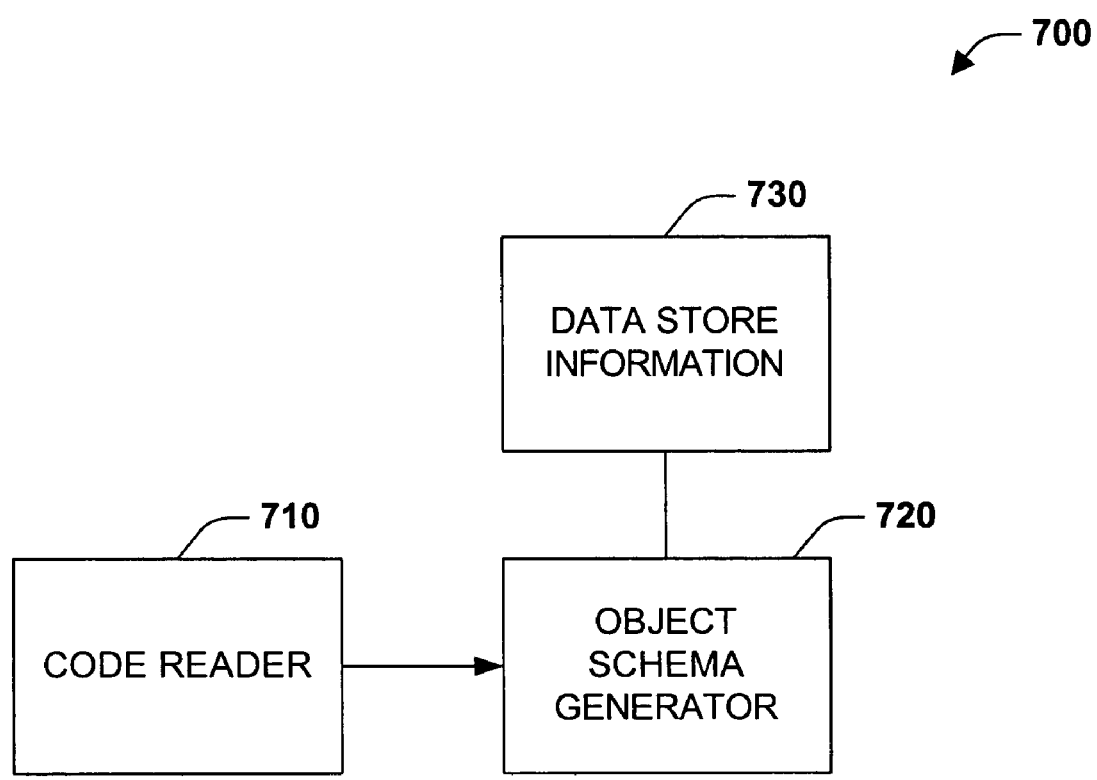
FIG. 7 is a schematic block diagram of an object schema generation system in accordance with an aspect of the subject invention.

Turning to FIG. 7, a system object schema generation system 700 is depicted in accordance with an aspect of the subject invention. Object schema generation system includes code reader component 710, object schema generator component 720 and data store information component 730. Code reader component 710 is adapted to read and/or retrieve information from a particular program or group of programs. According to an aspect of the invention the program is an object-oriented program. The program can describe objects via classes and class members. The code reader component 710 can provide the retrieved code to the schema generation component 720. For example, code can be provided in real time, as it is being read or transferred en masse upon complete reading of the code. Code generation component 720 can subsequently utilize the code provided by the code reader component 710 to produce a schema. The schema provides metadata concerning objects and their relationships beyond that provided by the type system of the code language. The code generation component 720 can generate classes and members of classes to represent specified objects. The code generation component can also generate a relationships section to define the relations amongst classes and members. Classes, members of classes and relationships are all provided to facilitate persistence to a data store. The data store can be a relational database, for example. In accordance with an aspect of the subject invention the code generation component can generate the object schema in an extendible markup language (XML). Furthermore, data base information component 730 can be utilized by the generation component 720 to develop a schema. Information component 730 provides information concerning the data store to which data is to be persisted thereby facilitating production of an appropriate object schema. It should be appreciated that schema generation component 720 can employ a myriad of methodologies and technologies to produce a schema. According to one aspect of the subject invention, generation component 720 can employ artificial intelligence technologies to generate a schema from provided code. For example, the generation component 720 could utilize a rule-based system to provide the heuristics necessary to build a schema. Furthermore, the subject invention also contemplates employment of statistical methodologies (e.g., neural networks, Bayesian networks . . . ) to infer the proper schema structure from the provided code.

Figure 8:
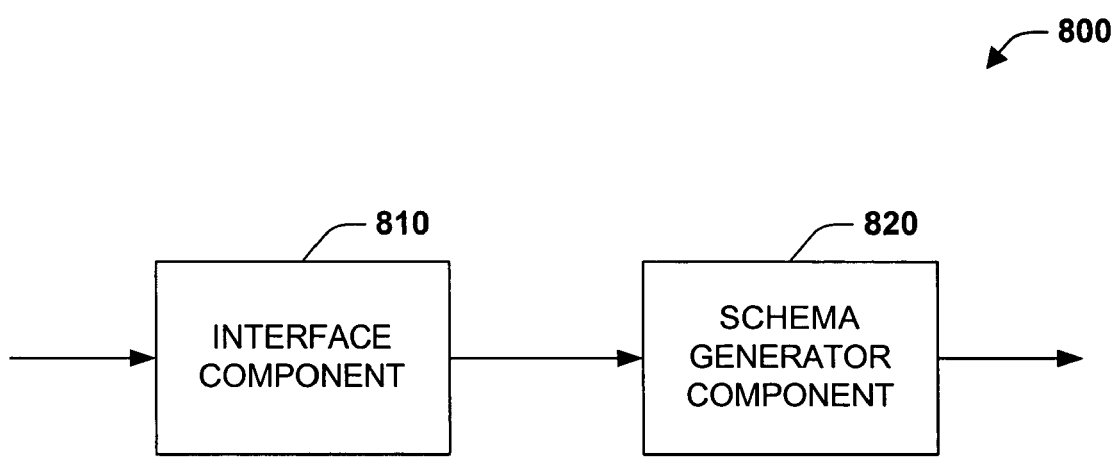
FIG. 8 is a schematic block diagram or an object schema generation system in accordance with an aspect of the present invention.

In accordance with the present invention an object schema can be written by hand by a developer, automatically generated, or generated by a developer with the help of a graphical user interface or wizard, for example. Turning to FIG. 8, a system 800 for generating an object schema is depicted in accordance with an aspect of the present invention. System 800 comprises an interface component 810 and a schema generator component 820. Interface component 810 receives input from users, such as a developer. Furthermore, the interface component 810 can also receive a program such as an object-oriented program as input. The interface component 810 can be a graphical user interface containing a plurality of graphical components that facilitate generation of a schema including but not limited to a buttons, text boxes, drop-down menus, tabs, hyperlinks, check boxes, and scroll bars. A user can then interact with the interface component utilizing input devices such as a keyboard and/or a pointing device (e.g., touch pad, touch screen, stylus, mouse, track ball . . . ). The interface component 810 can be a free form tool for use by a developer or a wizard that specifies a series of steps, wherein each step must be completed before a user is allowed to advance to the next step in the series. The schema generator component 820 receives and/or retrieves information from the interface component 810. Subsequently and/or concurrently therewith, the generator component 820 can produce a schema in accordance with the data provided by the interface component 810. In accordance with an aspect of the subject invention the generator can produce an XML schema describing declared objects and their relations as specified in an object oriented programming language, for example. Furthermore, it is to be appreciated that generator component 820 can utilize adaptive artificial intelligence technologies (e.g., expert systems, Bayesian networks, neural networks . . . ) to further facilitate development of a schema.

Figure 9:
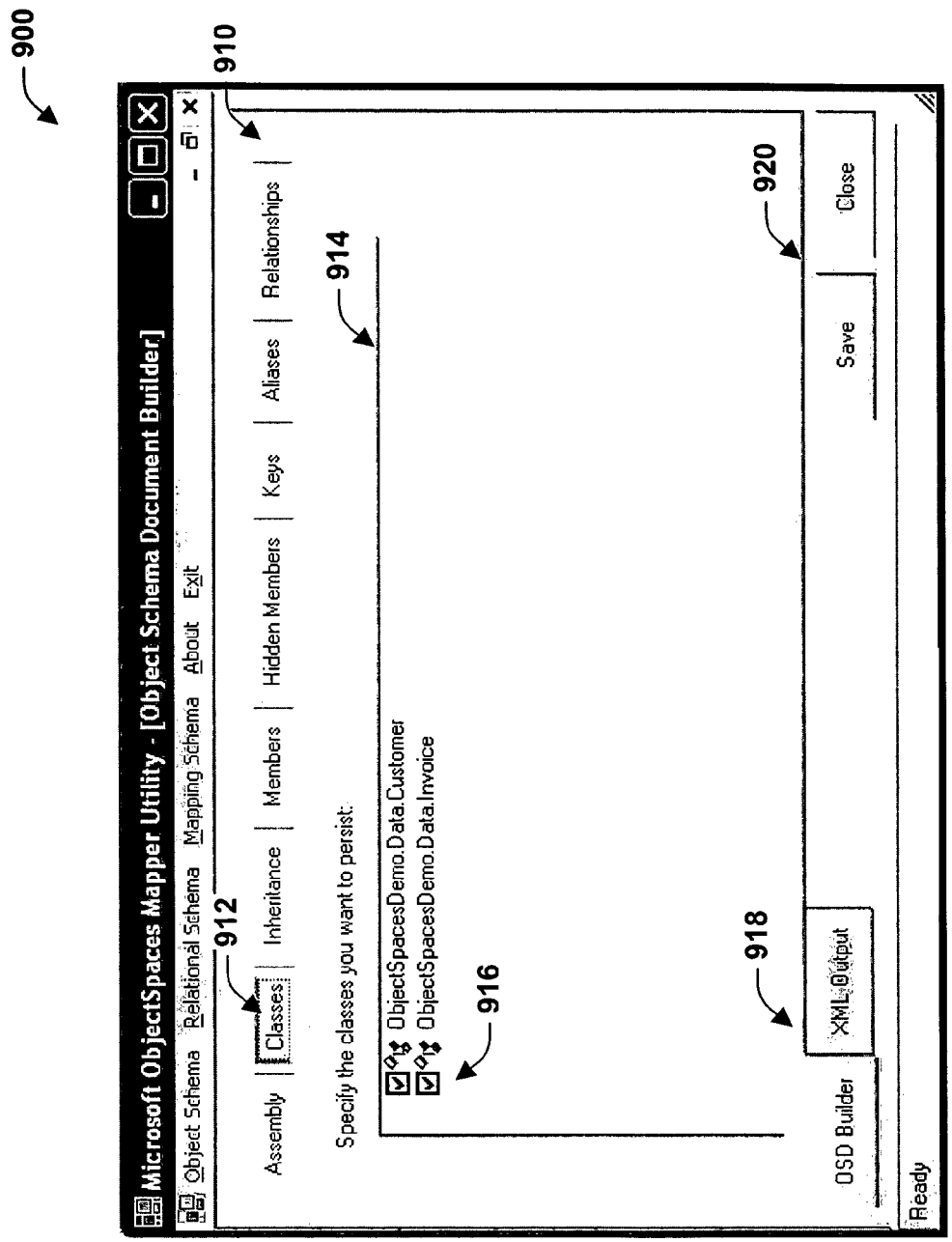
FIG. 9 is an exemplary graphical user interface that can be utilized in conjunction with an object generation system in accordance with an aspect of the subject invention.
Figure 10:
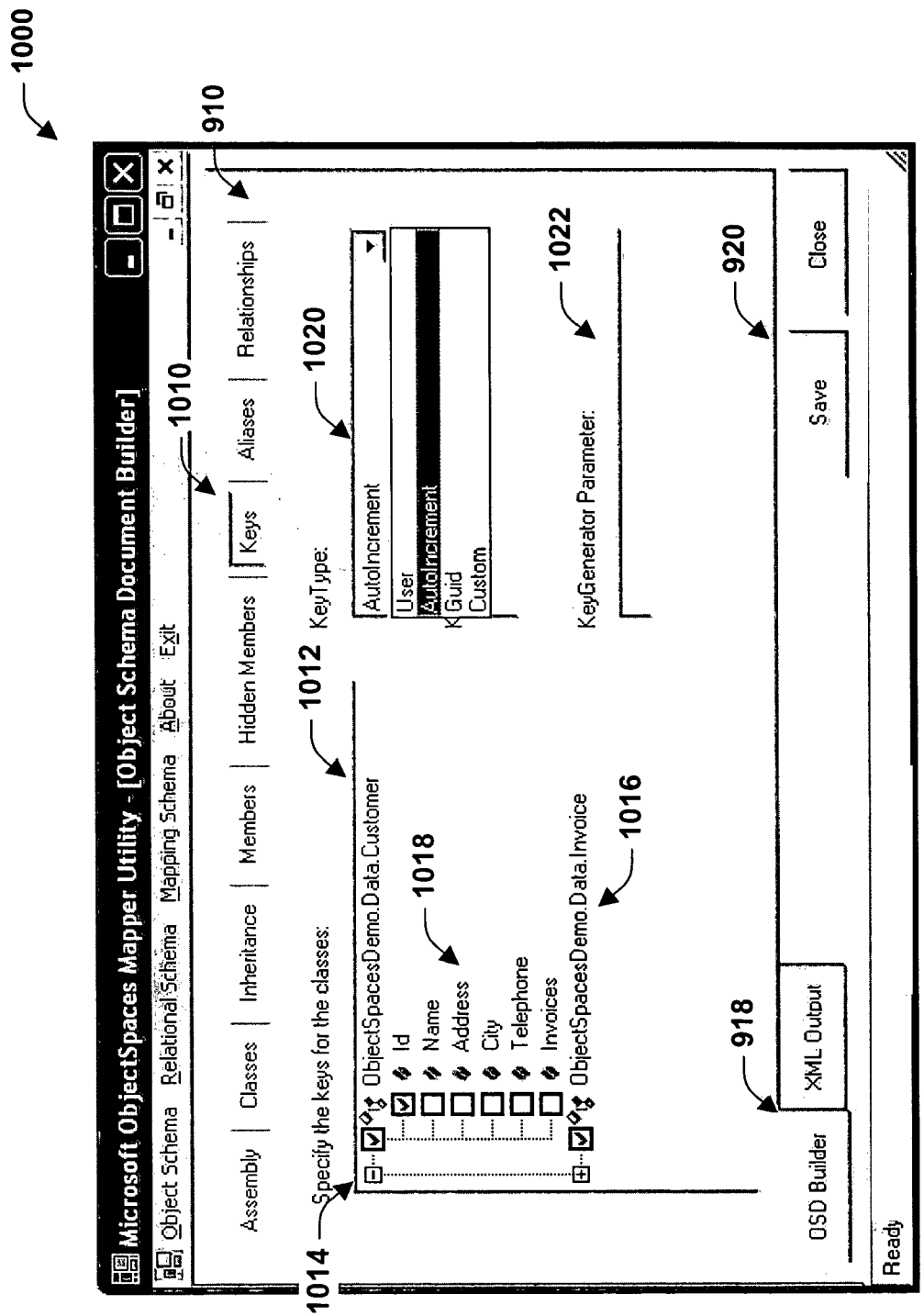
FIG. 10 is an exemplary graphical user interface that can be utilized in conjunction with an object generation system in accordance with an aspect of the present invention.

FIGS. 9-10 illustrate various aspects of an exemplary graphical user interface that can be employed in accordance with the subject invention. Turning first to FIG. 9, a graphical user interface 900 is illustrated in accordance with an aspect of the subject invention. Interface component 900 includes a myriad of different graphical components to facilitate specification of a schema. Selectable tabs 910 provide a means for selecting amongst a plurality of schema structure categories including assembly, classes, inheritance, members, hidden members, keys, aliases, and relationships. Here, tab 912 has been selected corresponding to classes. Text box or window 914 is provided to facilitate interaction with class components. In particular, the text box 914 allows a user or developer to select classes to be persisted by checking the classes off using a check box 916. Classes associated with a program can be automatically revealed in text box 914 for selection, by providing the program as input into the interface. However, text box 914 can just as easily provide an editable space for manually inputting classes to be persisted. Tabs 918 can provide a mechanism for switching between the schema builder components and the produced object schema, here in XML. Finally, buttons 920 can be provided to save the generated schema and/or close out of the builder interface.

FIG. 10 illustrates a graphical user interface 1000 that can be utilized in conjunction with a schema generation system or builder in accordance with an aspect of the subject invention. In particular, graphical user interface 1000 includes selectable tabs 910. Here, the tab 1010 associated with schema keys has been selected. Accordingly, a text box 1012 can be provided for locating member keys. Specifically, a hierarchical expandable tree 1014 can be utilized for displaying classes 1016 to be persisted and their associated members 1018. A developer can select a class with a "+" sign utilizing a pointing device or a keyboard to view class members. The member can be selected as a key by selecting a check box associated with and located proximate to the member. A developer can also select a class with a "−" sign to collapse the tree and remove the members associated with the class from view. Furthermore, drop down menu 1020 can be utilized to select a key type or text box 1022 can be employed to specify a key generator parameter. As with the GUI 900, tabs 918 can be used to selectively view either the interface builder components or the actual schema being generated by the interface. Buttons 920 can be employed to save the current schema and close out of the interface.

Figure 11:
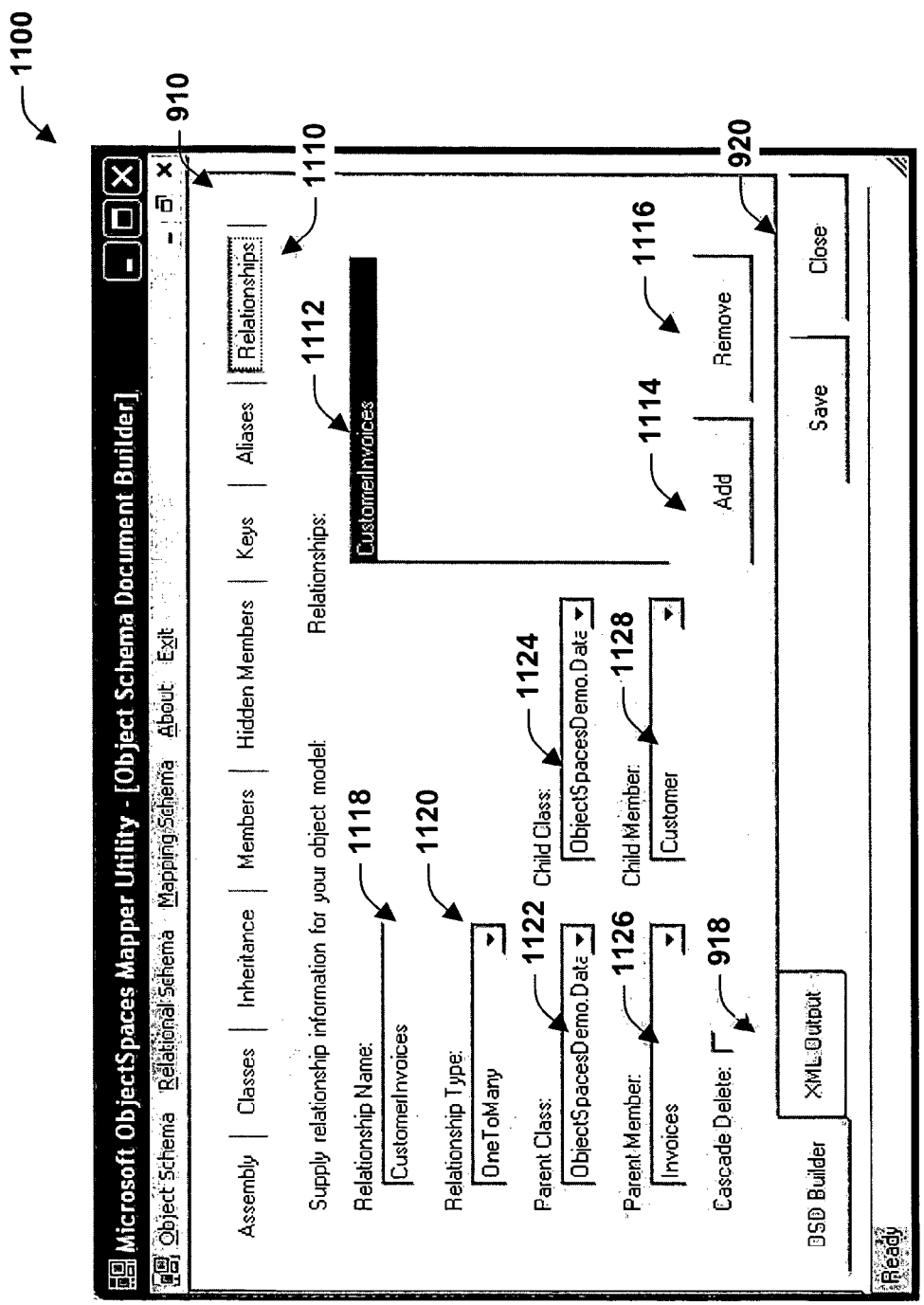
FIG. 11 is an exemplary graphical user interface that can be utilized in conjunction with an object generation system in accordance with an aspect of the subject invention.

FIG. 11 depicts an exemplary graphical user interface 1100 in accordance with an aspect of the subject invention. Interface 1100 includes selectable tabs 910. The present interface illustrates the selection of relationship tab 1110. Text box 1112 displays the name of defined relationships. A user or developer can employ button 1114 to add a new relationship or button 1116 to delete a previously defined relationship. To define a new relationship text boxes and drop down menus 1118-1128 can be utilized. Text box 1118 can be utilized to receive the name of the relationship being defined. Drop down menu 1120 can be employed to define, via selection, the type of relationship (e.g., one-to-one, one-to-many, many-to-many . . . ). Drop down menu 1122 provides a mechanism for specifying a parent class while drop down menu 1124 provides a means to specify a child class. A developer can further indicate a parent member using drop down menu 1126 and a child member utilizing drop down menu 1128. After a relationship has been completely specified, it can be added by selecting button 1114. Additionally, a developer can switch between interface components and the schema as coded by a interface component utilizing tabs 918. Finally, the interface can be closed and/or newly defined properties can be saved utilizing either of buttons 920.

Figure 12:
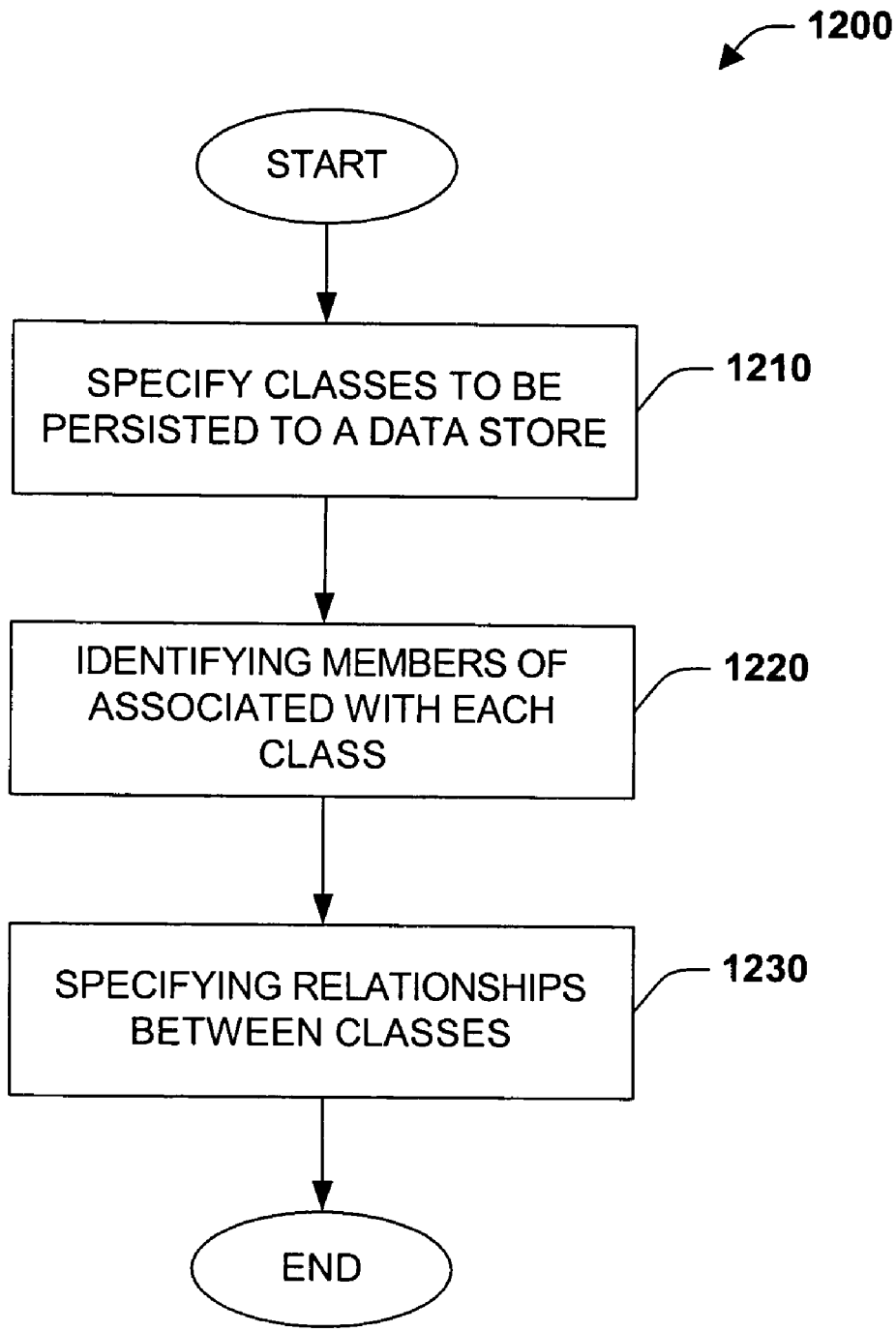
FIG. 12 is a flow chart diagram of a schema generation methodology in accordance with an aspect of the present invention.
Figure 13:
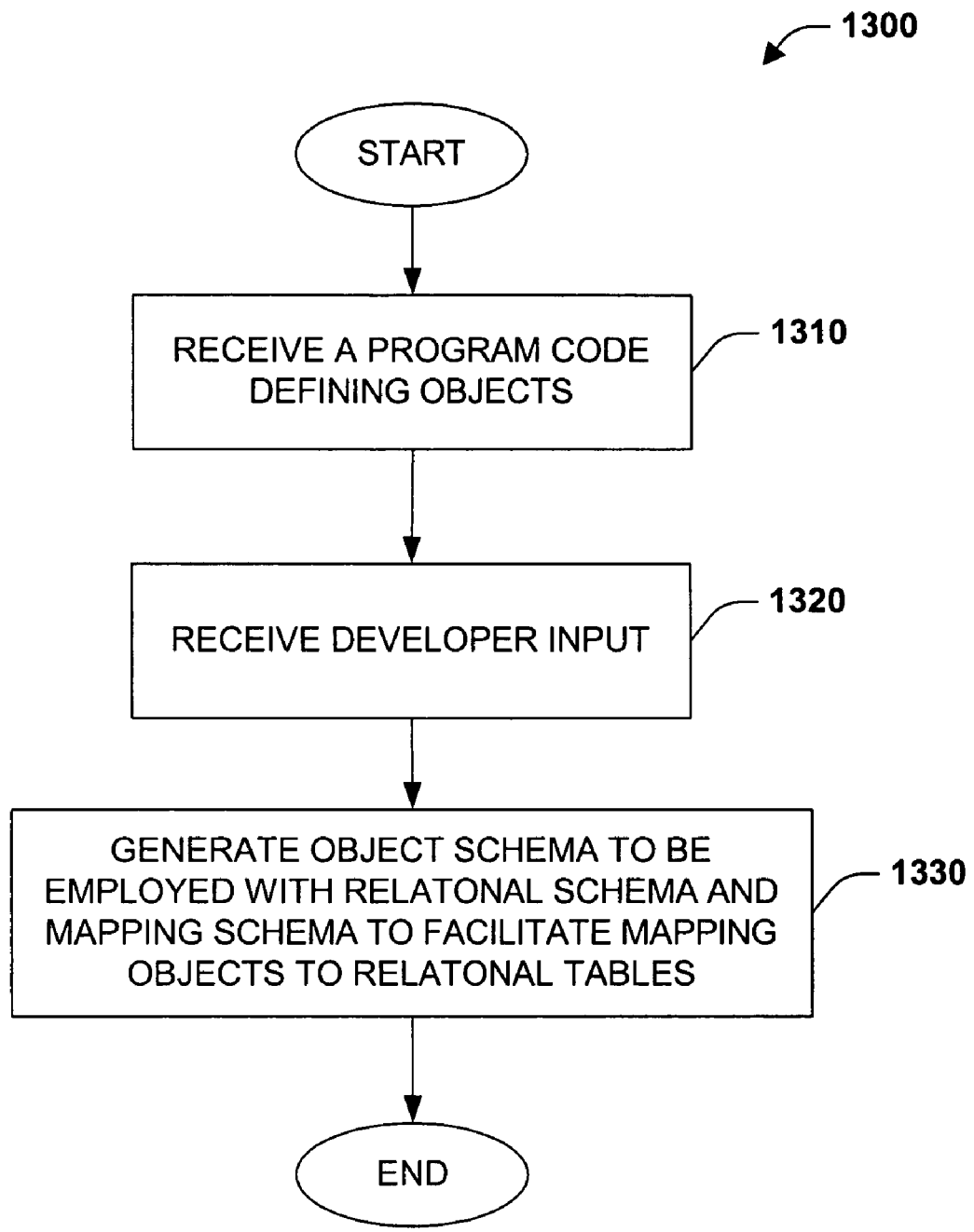
FIG. 13 is a flow chart diagram of a schema generation methodology in accordance with an aspect of the subject invention.

In view of the exemplary system(s) described supra, a methodology that may be implemented in accordance with the present invention will be better appreciated with reference to the flow charts of FIGS. 12-13. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

FIG. 12 depicts a schema generation methodology 1200 in accordance with an aspect of the subject invention. At 1210, the classes to be persisted to a data store are specified. Classes can correspond to types defined using an object oriented language such as C#, or other common language runtime (CLR) lanuages, for example. Furthermore, according to one aspect of the invention the data store can be a can be a relational database. At 1220, members associated with each class to be persisted are identified. Members can include class fields and properties. Furthermore, members can be compound member s comprising at least one field or property and another compound member. Thus, a compound member can be an array. Still further yet, it should be appreciated that member attributes can also be specified. For example, a member can be identified as a key or a member can identify an alias. At 1230, relationships between classes can be defined. For example, classes can be related in one-to-one, one-to-many or many-to-many fashion. Defining relationships amongst classes can include specifying a parent class and a child class, as well as specifying a member associated with the parent and a member associated with the child. According to an aspect of the invention, the classes, members, and relationship can all be specified utilizing XML file or document. This document can then be utilized together with a relational schema and a mapping schema to facilitate mapping objects to relation database tables to facilitate object persistence.

FIG. 13 illustrates a methodology 1300 for generating an object schema in accordance with an aspect of the subject invention. At 1310, a program code is received which defines objects. Such program code can specified utilizing an object oriented programming language, for instance. At 1320, developer input is received and/or retrieved. A developer can provide input utilizing a graphical user interface, for example. Such developer input can correspond to defining classes and members to be persisted to a database. Furthermore, a developer can utilize an interface to specify relationships amongst classes. At 1330, object schema can be generated, for example, in XML format. The object schema can then be utilized in conjunction with a relational schema and a mapping schema to facilitate mapping objects to relational database tables, for example.

Figure 14:
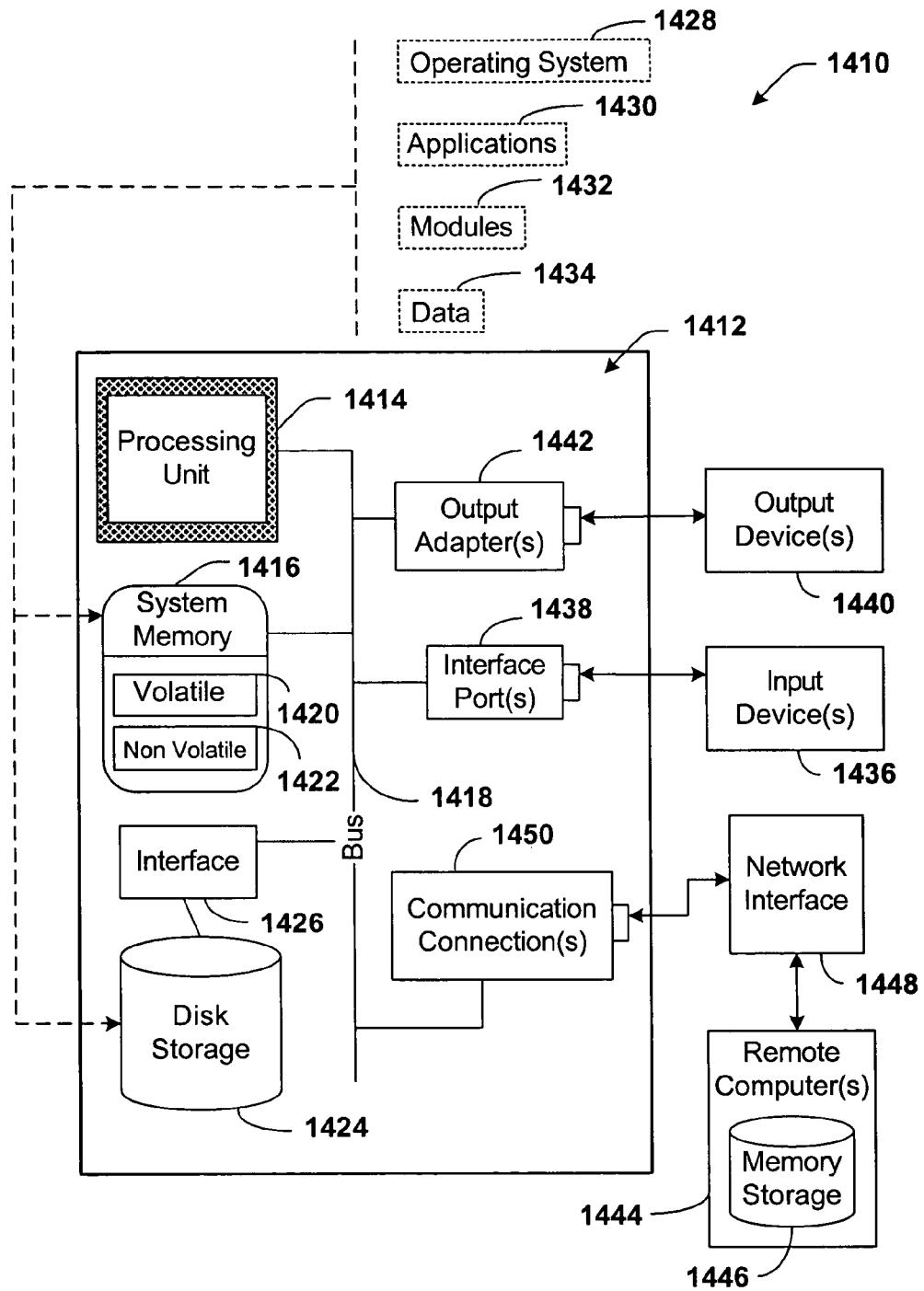
FIG. 14 is a schematic block diagram illustrating a suitable operating environment in accordance with an aspect of the present invention.

In order to provide a context for the various aspects of the invention, FIG. 14 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example disk storage 1424. Disk storage 4124 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. Furthermore, it is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, touch screen, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like monitors, speakers, and printers, among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems, DSL modems, power modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes or having" is used in either the detailed description or the claims, such term is intended to be inclusive in a manner similar to the term "comprising" as "comprising" is interpreted when employed as a transitional word in a claim.

What is claimed is:

1. A method implemented by a computing system having a processor coupled to a memory for generating an object schema used in mapping between a relational database and objects from an object oriented programming language comprising:

receiving program code that describes one or more classes which define objects, wherein the objects are components from an object oriented programming language comprising data structures and functions operable on data;

describing members of each class, wherein the members of each class comprise compound members, wherein the compound members comprise a second member and at least one of a plurality of attributes describing the members of each class, and wherein the compound members allow mapping of complex members as inline members of a given class, which allows inline mapping of arrays, structs and entity key members;

specifying relationships between the one or more classes;

receiving input from a developer through an interface component;

generating an object schema using the input received from the interface component to be employed to facilitate mapping the objects described in the received program code to tables in a relational database, wherein data in the relational database describes the objects and the data in the relational database persists, the object schema comprising:

a first data structure comprising a plurality of attributes describing the one or more classes which define the objects, the plurality of attributes describing the one or more classes comprising at least a persistence service class attribute designating a persistence service to use when persisting a particular class associated with the persistence service class attribute;

a second data structure comprising the plurality of attributes describing the members of each class, the plurality of attributes describing the members of each class comprising at least a hidden attribute that defines if there is a hidden member in a corresponding class and manages the hidden member in a transparent fashion, a key generator attribute designating a user class that is to act as a custom key generator, and a key generator parameter attribute designating parameters to be passed to the custom key generator;

a third data structure comprising a plurality of attributes describing the relationships between the one or more classes, the plurality of attributes describing the relationships between the one or more classes comprising at least a relationship name attribute identifying a unique name for a relationship, and a relationship type attribute identifying a type of predefined relationship; and wherein at least one of the members described in the second data structure contains an alias attribute to query a private member, the alias attribute pointing to a public member that is to be utilized in place of the associated private member in text of a query;

providing a relational schema that provides details regarding the relational database and utilizes metadata associated with the database to generate an implementation neutral or an implementation specific format that represents the database structure; and providing a mapping schema that provides a mapping between the object schema and the relational schema.

2. The method of claim 1, wherein the input component is a graphical user interface.

3. The method of claim 1, wherein the schema is an XML schema.

4. A computer readable storage medium having stored thereon computer executable instructions, which when executed by a processor, carry out the method of claim 1.

5. A system that facilitates generating an object schema used in mapping between a relational database and objects from an application written in an object-oriented programming language, comprising:

a processor; and a memory storing computer executable instructions, which when executed by the processor carry out the method of claim 1.

6. The method of claim 1, wherein the plurality of attributes describing the one or more classes further comprises one or more of name, base class, persistence service assembly, and paths.

7. The method of claim 1, wherein the plurality of attributes describing the members of each class further comprises one or more of name, key, key type, type, array length, and search inheritance hierarchy.

8. The method of claim 1, wherein the plurality of attributes describing the relationships between the one or more classes further comprises one or more of parent class, child class, parent member, child member, composition, parent cardinality, child cardinality, and default span.

9. The method of claim 1, wherein the relationship between the one or more classes is one of one-to-one, one-to-many, and many-to-many.

10. The method of claim 1, wherein the relationship between the one or more classes is a parent-child relationship.

11. The method of claim 1, wherein generating the object schema further uses adaptive artificial intelligence technologies including one of a Bayesian network or neural networks to infer proper schema structures and relationships.

12. The method of claim 1, wherein the program code is received in real time as it is being read or transferred en masse upon complete reading of the program code.

13. The method of claim 2, wherein the graphical user interface includes at least one of buttons, text boxes, drop-down menus, tabs, hyperlinks, check boxes, and scroll bars.

14. The method of claim 13, wherein the graphical interface comprises tabs and the tabs are selected from a list of assembly, classes, inheritance, members, hidden members, keys, aliases, and relationships.

15. The method of claim 13, wherein the graphical interface comprises tabs and the tabs are selected from a list of object schema document (OSD) builder and extensible markup language (XML) output.

16. The method of claim 1, wherein the interface component is a wizard that specifies a series of steps and each step must be completed before the developer is allowed to advance to a next step in the series of steps.

* * * * *